United States Patent Office 3,517,058
Patented June 23, 1970

3,517,058
PREPARATION OF BETA-MERCAPTO-
PROPIONIC ACID
Jozef A. Thoma, Vaals, Jules P. J. Ponnet, Spaubeek, and
Joseph A. M. J. Coonen, Geleen, Netherlands, assignors
to Stamicarbon N.V., Heerlen, Netherlands
No Drawing. Filed June 20, 1966, Ser. No. 558,578
Claims priority, application Netherlands, July 3, 1965,
6508594
Int. Cl. C07c 149/00
U.S. Cl. 260—526                    2 Claims

ABSTRACT OF THE DISCLOSURE

Process for the preparation of beta-mercaptopropionic acid from acrylic acid by reacting acrylic acid with a molar excess of liquid hydrogen sulfide in the presence of an organic base, in an equivalent amount in excess of the acrylic acid.

---

The present invention relates to the preparation of beta-mercaptopropionic acid.

The beta-mercaptopropionic acid, which finds commercial use as an antioxidant in artificial fibers and other high molecular weight polymers, can be prepared in various ways. However, the known methods of preparation, for instance the preparation from propiolactone, beta-halogenopropionic acid, or acrylonitrile, by reaction with sodium hydrosulphide, sodium sulphide, or thiourea, have the disadvantage that the starting materials needed are either difficult to obtain and expensive, and/or that the preparation route is unattractive because only small yields are obtained.

For instance, in a relatively easy preparation method, beta-mercaptopropionic acid is obtained from acrylic acid by treating the same with about ten times the amount by weight of an organic base (e.g., diethyl amine), both dissolved in ethanol, by saturating the solution with hydrogen sulphide at low temperature (−20° C.), and thereafter heating the mixture for some hours at 70° C. in a closed reaction vessel. However, the yield of this process is only about 50%.

It has now been discovered, however, that this preparation method can be improved, so that a considerably higher yield is reached.

According to this invention, it has been found that high yields of beta-mercaptopropionic acid can be obtained from acrylic acid, if the acrylic acid is reacted with liquid hydrogen sulphide.

This reaction of the acrylic acid with liquid hydrogen sulphide is effected in the presence of an organic base. Since in this reaction a salt compound is formed between the acrylic acid, or the beta-mercaptopropionic acid formed from it, and the organic base, the amount of base used should be sufficient to ensure the presence in the reaction mixture of an excess of organic base, not bound to acid. Most suitably, the amount of organic base is at least about 1.01–1.1 times the amount of base equivalent to the acrylic acid. The use of larger amounts of base, e.g., an amount equal to or more than the total equivalent of acrylic acid and hydrogen sulphide together, is unnecessary and affords no advantage. The amount of unbound base promotes the reaction with the hydrogen sulphide in the manner of a catalyst, so that a small amount is sufficient.

Examples of suitable organic bases are generally aliphatic secondary and tertiary amines, e.g. triethyl amine or diethyl amine (that is, secondary and tertiary lower alkyl amines), diamines, e.g. tetramethylene diamine, and also aliphatic cyclic amines such as piperidine. Quaternary ammonium bases may also be used.

The amount of hydrogen sulphide theoretically required for the reaction is one mole per mole of acrylic acid. Preferably an excess amount of 1.5–10 moles of hydrogen sulphide is used per mole of acrylic acid.

The temperature at which the reaction is carried out may be varied, the reaction proceeds most efficiently at a temperature of about −10 to about 50° C., in which range the hydrogen sulphide can easily be kept in the liquid state by using low superatmospheric pressure of about 5 to about 25 atm., and only simple apparatus need be used.

After the reaction has stopped, the excess hydrogen sulphide can be conveniently removed by evaporation and the reaction product can then, after having been acidified, be processed and removed in a manner conventional in itself, e.g. by distillation or extraction.

The invention is further illustrated by the following examples, however it will be understood that the process is not limited to these specific embodiments.

EXAMPLE 1

In an autoclave having a volume of ¾ litre 70 g. of liquid hydrogen sulphide (2.06 moles) is added to 53.1 g. of triethyl amine (0.52 mole) at a temperature of 15° C. The pressure is 8 atm.

Thereafter 36.0 g. of acrylic acid (0.47 mole, content 93.8% by weight) is added slowly in 15 minutes, the temperature being meanwhile kept at 15° C.

After the excess hydrogen sulphide has been removed by evaporation, the reaction product is acidified with hydrogen chloride to a pH value of 2, saturated with ammonium sulphate, and extracted with ether. After the ether has been evaporated, the product is distilled.

An amount of 45.2 g. of beta-mercaptopropionic acid (boiling point 85° C. at 3 mm. Hg), is obtained, so that the yield of the preparation process is 91%.

The residue of the distillation (4 g.) consists mainly of dithiodipropionic acid.

EXAMPLE 2

In a similar manner as described in Example 1, 74 g. of acrylic acid (0.99 mole, content 96.5% by weight) is added slowly, in 46 minutes to 90.7 g. of piperidine (1.07 moles) and 188.5 g. of liquid hydrogen sulphide (5.55 moles), the temperature being meanwhile kept at 0° C. and the pressure at 12 atm.

After processing of the reaction product, 94.6 g. of beta-mercaptopropionic acid is obtained (yield 90%).

EXAMPLE 3

In a similar way as described in Example 1, 74.3 g. of acrylic acid (1.01 moles, content 97.8% by weight) is added slowly, in 45 minutes, to 175 g. of trimethyl benzyl ammonium hydroxide (1.05 moles) and 233 g. of liquid hydrogen sulphide (6.85 moles) in a 1-litre autoclave. The temperature is kept at 15° C. and the pressure at 15 atm.

After the reaction product has been processed, 94.2 g. of beta-mercaptopropionic acid is obtained (yield 88%).

The yields of beta-mercaptopropionic acid obtained in accordance with the preceding examples can be increased further by hydrogen-reduction of the by-product dithiodipropionic acid, in the presence of a suitable hydrogenation catalyst, to beta-mercaptopropionic acid.

In this hydrogenation the use of rhenium sulphide and rhenium selenide as catalysts gives good results, as will be explained in the following Example 4.

EXAMPLE 4

In an autoclave having a volume of ¾ litre a mixture of 142 g. of water, 31.5 g. of dithiodipropionic acid (0.15 mole) and 1 g. of rhenium heptasulphide is subjected to a hydrogen pressure of 150 atm. Subsequently the temperature is raised slowly, in two hours' time, to 140° C., after which the autoclave is cooled to room temperature.

The reaction product is extracted with methylene chloride, and the resulting solution is distilled, which yields 29 g. of beta-mercaptopropionic acid (0.27 mole; efficiency 91.4%).

When this hydrogenation is repeated, with 1 g. of rhenium heptaselenide as catalyst, the yield of beta-mercaptopropionic acid is equivalent to an efficiency of 85%.

It will be appreciated that the practice of this invention may thus be effected in various ways, as limited solely by the spirit and scope of the following claims.

What is claimed is:

1. In a process for the preparation of beta-mercaptopropionic acid from acrylic acid by reacting acrylic acid with a molar excess of hydrogen sulfide in the presence of an organic base selected from the group consisting of secondary and tertiary lower alkylamines, lower alkyldiamines, aliphatic cyclic amines and quaternary ammonium bases, the improvement of carrying out the said reaction with liquid hydrogen sulfide at a temperature of −10 to 50° C.

2. A process according to claim 1, wherein about 1.5 to 10 moles of liquid hydrogen sulphide are used per mole of acrylic acid.

References Cited

Dahlbom, Acta Chemica Scandinavica, 5, pp. 690–698 (1951).

JAMES A. PATTEN, Primary Examiner

U.S. Cl. X.R.

260—537